United States Patent [19]

Ackel

[11] Patent Number: 4,738,750
[45] Date of Patent: Apr. 19, 1988

[54] SYSTEM AND METHOD FOR TREATING PULP AND PAPER MILL WASTE WATER

[75] Inventor: Charles S. Ackel, Norcross, Ga.
[73] Assignee: Stone Container Corp., Chicago, Ill.
[21] Appl. No.: 827,947
[22] Filed: Feb. 10, 1986
[51] Int. Cl.[4] .......................... D21C 11/00; C02F 9/00
[52] U.S. Cl. ........................................ 162/29; 162/31; 162/189; 210/631; 210/703; 210/704; 210/705; 210/711; 210/769; 210/928
[58] Field of Search ..................... 162/29, 31, 47, 190, 162/189; 423/DIG. 13; 210/928, 729, 703, 721, 704, 758, 705, 711, 631, 769; 422/185

[56] References Cited

U.S. PATENT DOCUMENTS

| | | | |
|---|---|---|---|
| 3,412,018 | 11/1968 | Monzie | 210/928 |
| 3,740,363 | 6/1973 | Fuller | 210/928 |
| 3,829,388 | 8/1974 | Lange | 162/29 |
| 4,008,161 | 2/1977 | Wong et al. | 162/29 |
| 4,058,458 | 11/1977 | Svarz | 162/29 |
| 4,089,780 | 5/1978 | Svarz | 210/928 |
| 4,179,329 | 12/1979 | Svarz | 162/29 |
| 4,374,027 | 2/1983 | Severeid et al. | 162/29 |
| 4,490,257 | 12/1984 | Becker | 210/928 |

OTHER PUBLICATIONS

Kisla et al, "Color Removal from Softwood Kraft Pulp Bleach Plant by Polyamines", *Environmental Sci. & Tech.*, vol. 12, No. 2, Feb. 1978, pp. 207–211.
Jordan Assoc., "Waste Water Treatment and Disposal Options" Feasibility Study for Continental Forest Ind., Nov. 24, 1982, pp. B-11-B-38.

*Primary Examiner*—Peter Chin
*Attorney, Agent, or Firm*—Jones, Day, Reavis and Pogue

[57] ABSTRACT

A system and method for converting pulp and paper mill waste water into a decolored, neutral pH effluent and a solid suitable for use as fuel in a furnace. The treatment system is used following primary and secondary treatment of pulp and paper mill waste waters typically found in the industry. After secondary biological treatment, the waste waters are pumped to a coagulation tank where the waste water is brought in contact with a polyamine coagulant which coagulates lignins, degraded sugars, and other compounds which typically discolor this water. The coagulation particles are increased in size by addition of an acrylamide polymer in a flocculation tank to improve the hydrophilic characteristics of the coagulant. The waste water is then mixed a dissolved air and water solution under pressure. Upon dissolution of the dissolved air at atmospheric pressure the air is absorbed by the flocculated matter in the aeration tank and the flocculated matter is caused to migrate towards the area of less pressure, i.e. the surface of the tank. The flocculated matter accumulates on the surface of the flocculating tank and can be skimmed from the top, dried and ultimately burned in a furnace.

11 Claims, 2 Drawing Sheets

SYSTEM AND METHOD FOR TREATING PULP AND PAPER MILL WASTE WATER

BACKGROUND OF THE INVENTION

The invention pertains to treatment of pulp and mill waste water. In particular, the invention relates to treatment of the total waste water effluent from a pulp and paper mill for removal of colored constituents, such as lignins and degraded sugars, producing a neutral range pH effluent and a solid suitable for burning.

In the past, waste waters coming from the papermaking processes were decolored by treatment with chemicals to adjust their pH to between 2 and 5 before contacting them with an organic phase containing an amine insoluble in water. A water insoluble organophilic amine complex was formed containing the compounds of the organic matter and colored products in the waste water which thereupon were removed. See, for example U.S. Pat. No. 3,412,018 issued to Monzie on Nov. 19, 1968. Similarly, U.S. Pat. No. 4,089,780 to Svarz et al. (May 16, 1978) removed color from paper mill waste waters by treatment with a cationic water soluble polyamine having an average molecular weight of at least 300 at a pH of 2 to 5, followed by precipitation with a water soluble anionic or nonionic organic polymer. Fuller, U.S. Pat. No. 3,740,363, removed colored bodies in a pretreatment stage by coagulation with alum in an acid solution and sedimentation of the coagulant in a gravity sedimentation clarifier. All of these past processes, while removing the color from waste water, left a highly acidic liquid which would damage the environment or require significant buffering, in order to be made suitable for release to the environment.

The removal of colored constituents has previously been done to papermaking waste water in order to recycle the colored constituents back to the papermaking processes. This treatment, referred to as a "pretreatment", as disclosed in applicant's co-pending U.S. patent application Ser. No. 711,238, filed Mar. 13, 1985, can only be used in treatment of certain concentrated streams of waste water from the pulp mill processes which have and undergone primary and secondary waste water treatment. Consequently, the "pretreatment" processes cannot be used to produce a neutral pH waste water having low enough concentration of colored bodies to allow release directly to the open environment.

Accordingly, it is an object of the present invention to provide a system for treatment of the entire pulp and paper mill waste water effluent which converts this waste water to a liquid containing a low concentration of colored bodies at a near neutral pH, and a solid suitable for burning in a furnace or recycle to the papermaking process.

It is another object of the present invention to provide a system and a method for decoloring waste water, removing insoluble BOD, phosphates and hydrogen sulfide.

It is another object of the present invention to provide a system and a method for removing colored bodies from the the waste water in a manner that said colored bodies are removed as a solid suitable for burning in a furnace.

It is yet another object of the invention to recover part of the originally added coagulant from the treated waste water, thus enabling reuse of the coagulum and reductions in overall cost of waste water treatment.

The foregoing and other objects, features, and advantages of this invention will be apparent from the following description and illustrations of the preferred embodiment of this invention.

SUMMARY OF THE INVENTION

The present invention provides both a system and a method for converting waste water produced in papermaking processes with or without pretreatment, such as disclosed in U.S. patent application Ser. No. 711,238, to a decolored, near neutral pH, liquid effluent and a solid suitable for burning in a furnace. The system comprises a series of tanks which can hold the waste water and mix the waste water or bring it in contact with various agents with an in-line continuous process.

The waste water treated initially from the pulp and paper mill is treated conventionally by primary clarification and secondary biological treatment. The biologically treated waste water then continues to a coagulation tank which communicates with a source of coagulant which allows the coagulant to contact the waste water in the coagulation tank. A coagulated precipitate is therein formed with the colored bodies which then travels with the waste water to a flocculation tank which further communicates with a source of acrylamide polymer. The acrylamide polymer is contacted with the waste water containing the coagulant, causing the coagulant to increase in size and to form a flocculated matter which has a larger more hydrophilic particle.

The floculation tank communicates with a dissolved air mixing tank such that the waste water containing the flocculated matter can flow into the mixing tank where it is mixed with water containing dissolved air. The mixing at the mixing tank causes the flocculated matter to adsorb to the air in solution. The aeration mixing tank also has a pressure gradient such that the flocculated matter which adsorbed the air bubbles will migrate toward the surface of the mixing tank where the atmospheric pressure is the lowest pressure available to the flocculated matter. Flocculated matter accumulates at the surface of the mixing tank and may be removed by a simple skimming operation, further treated and, ultimately, burned as a source of energy.

Dissolved air will not separate colloidal particles from suspension because these particles are too small to attach to air bubbles. The coagulum formed from the particles and the polyamine or alum also is too small. The function of the acrylamide polymer flocculent is to enlarge these particles to a size where air attachment will occur.

The method of the invention comprises biologically treating the waste water, adding a coagulating agent, such as polyamine, to the waste water to coagulate the colored materials, adding a flocculating agent to increase the size of the coagulated particles, and mixing the flocculated materials with pressurized aerated water, such that the air is adsorbed by the materials, and the flocculating materials will migrate to and accumulate near the surface of the waste water for removal.

BRIEF DESCRIPTION OF THE DRAWING

A better understanding of the invention may be had from a consideration of the following detailed description taken in conjunction with the following drawings, in which.

DETAILED DESCRIPTION OF THE INVENTION

Figure 1:
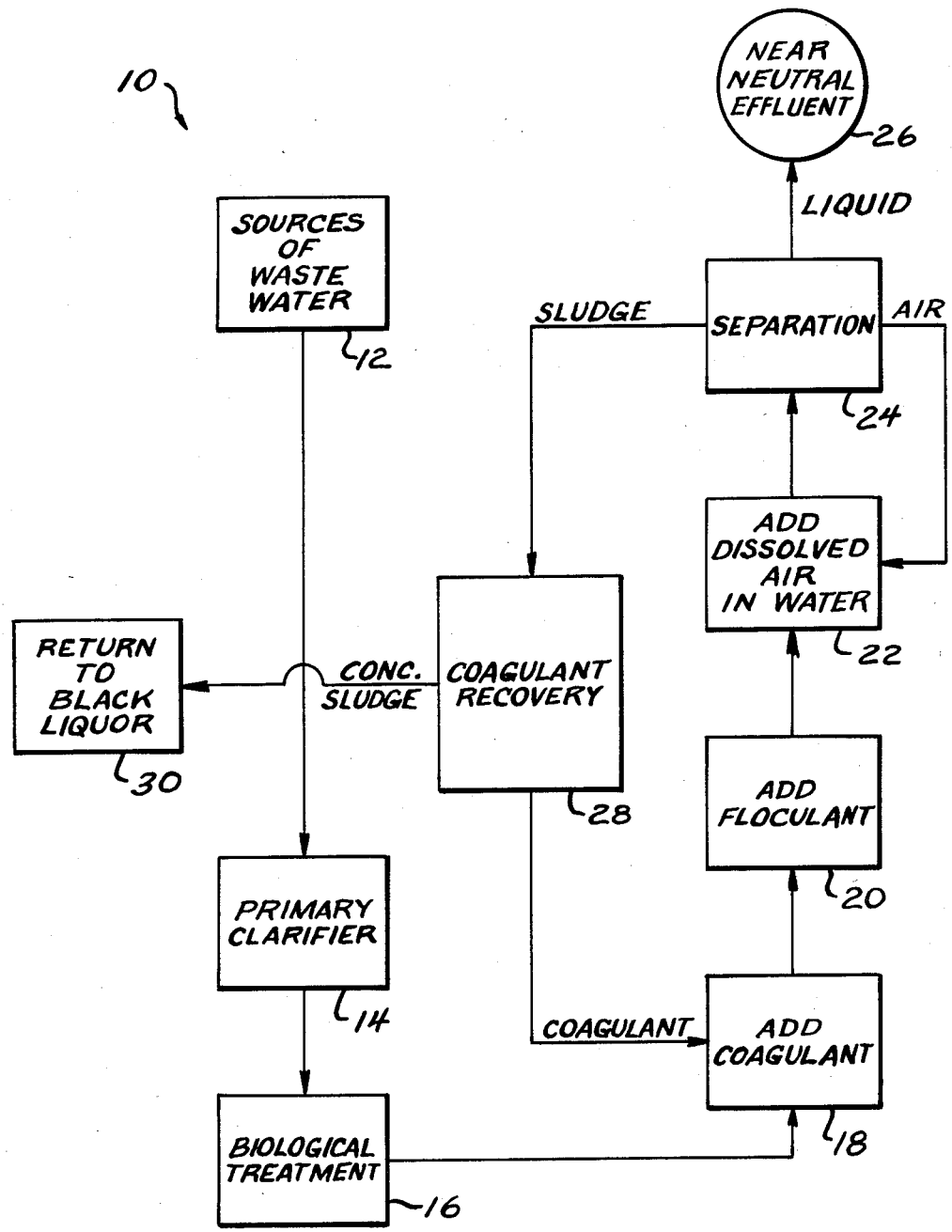
FIG. 1 is a flow diagram showing the preferred method of the invention.

The system and method of the present invention is understood by reference to the diagrams described above. Referring to FIG. 1, the general arrangement of the method steps is depicted by the numeral 10. Pulping in the pulp mill and paper making processes 12 produce waste water containing colored bodies (lignins, degraded sugars). A pretreatment is known generally in the prior art and is a distinct process from that which is the subject of the present invention. However, the continued recycling of the discharge from the papermaking processes ultimately produces a waste water having dilute colored contaminants which may not be adequately treated by known processes such that they may be recycled to the papermaking processes. That is, while the discharge from the papermaking may be recycled, eventually some discharge is too contaminated to recycle and must be purged.

The waste water leaving the papermaking processes 12 travels through normal, known-in-the-art conduits to a gravity sedimentation primary clarifier 14, where large sediments are removed from the waste stream, and then on to be biologically treated 16 to remove BOD. Such biological treatment and the methods of biological treatment are well known in the art, as revealed in Scott, R. H., "Sophisticated Treatment at Baikal Pulp Mill in U.S.S.R.", *Pulp and Paper*, Volume 48, No. 4, April, 1974, pp. 82–86; Amberg H. R. et al., "The Status of Water Pollution Control in the Soviet Union", *TAPPI*, Volume 58, No. 11, November, 1975, pp. 59–67; and Amberg H. R. et al., "The Status of Water Pollution Control in the Soviet Union", "TAPPI", Volume 58, No. 12, December, 1975, pp. 75–77.

Following biological treatment, the waste water continues on through conventional industrial conduit means to a coagulation tank where it is mixed with coagulants 18. The coagulant, preferably polyamine, is added to the waste water contained in the coagulation tank whereupon it acts to coagulate the lignins and degraded sugars which color the waste water. It is noted that the pH has not been adjusted in the waste water, except, possibly, slightly during biological treatment or with addition of the coagulant. The addition of the polyamine causes a coagulated precipitate to form in the coagulation tank. However, this precipitant is not easily removed from suspension as it is a very shear sensitive and settles slowly. While polyamine is the preferred coagulating agent, other hydrophilic precipitants may be used as coagulants, explained in detail in U.S. Pat. No. 3,740,363 to Fuller.

After coagulation 18, the waste stream continues to where flocculant is added 20. Normally this is accomplished by a tank which holds the waste water until such time as the precipitant is large enough to adsorb air bubbles, as is explained below.

Flocculation is preferably accomplished by contacting the waste stream in a tank with a source of acrylamide polymer. The acrylamide polymer increases the size of the coagulated precipitate, also without the necessity of acidifying the waste water. However, the presence of the large precipitate in the flocculant tank is much easier to remove from the water due to the improved hydrophilic characteristics. It was found through intense and long study that treatment for liquid/solid separation could not be effected in the presence of an intense turbulance or mechanical shear of the formed precipitate.

An important feature of the present invention is the particle size of the flocculated matter. It must be adequately large to adsorb air bubbles, as are used to remove the precipitate from the waste water. This is accomplished by use of a cationic coagulant to create an initial, positively charged particle in colloidal suspension. An even larger particle is thereafter created by addition, in a later method step, of an anionic flocculant, which attracts the positively charges particles formed by addition of the coagulant.

The flocculant tank 20 is in communication through conventional industrial conduits by gravity flow with an aeration mixing tank 22. The aeration mixing 22 also is in communication with a source of pressurized air in solution. The aeration mixing tank 22 provides an area of low pressure undulating mixing of the waste water containing the flocculated matter with a pressurized dissolved air solution.

The "dissolved air solution" is a saturated or near saturated solution of air and water which is maintained at 65 psi prior to release in the aeration mixing tank. The dissolved air solution may be prepared utilizing waters previously treated by this system. The ratio of dissolved air solution to waste water solution is less than 1:3.

The mixing of the dissolved air solution in an area of low pressure results in the evolution of small air bubbles which adsorb to the flocculated matter causing the flocculated matter to float, or migrate, to an area of reduced ambient pressure. The aeration mixing tank is open at the top allowing the flocculated matter to migrate towards the top of the separation tank 24 which is open to the atmosphere, the lowest pressure available in the system. The flocculated matter thereby accumulates at the surface of the separation tank 24 and may be skimmed off, or removed in any other way known in the art and, ultimately, burned for fuel in a Kraft recovery furnace. The liquid effluent 26 leaving the aeration mixing tank has very low concentration of color bodies, reduced BOD, TDS, $H_2S$, $PO_4$ contratrations and a pH essentially unchanged by the process, and is suitable for discharge into the open environment.

The present invention allows for the sludge to be removed without the need to alter the pH of the water to be discharged. This eliminates any steps required in adjusting the acidity or alkalinity of the waste water before ultimate discharge. Alternatively the sludge can be treated for recovery of the coagulant 28. In the case of the polyamine coagulant, acid and additional acrylamide polymer are added to the sludge. This secondary sludge is dewatered; the supernate contains the recoverable polyamine which could be used in the coagulation tank 18 to reduce the amount of fresh polyamine required.

The dewatered secondary sludge can be mixed with the black liquor as explained in the following text. The sludge removed from the treatment plant is a useable, fuel caliber sludge, as the sludge is derived from the pulp and paper process, and resembles the organic constituents of materials known in the industry as "black liquor". It is convenient and economically attractive to mix the sludge with the black liquor 30 prior to the evaporative and combustion process typical in the industry, on recovery of the black liquor. In this manner the sludge is of use which is in contrast to similar treatment which results in additional expense.

Further, the treatment described is cheaper and more effective than those previously known to remove, lignins and degraded sugars.

In summary, the method of the present invention comprises a tertiary treatment of waste waters which have been initially biologically treated. The colored materials are then coagulated by addition of a coagulant, preferably polyamine, to produce a coagulated precipitant. The coagulated precipitant is then increased in size by addition of an acrylamide polymer to the waste water to form a flocculated matter. The flocculated matter in the waste water is then mixed with pressurized air in solution, causing the flocculated matter to adsorb air bubbles and to float to an area of reduced pressure in a pressure gradient. The accumulated flocculated matter, can then be removed by skimming or any other method known in the art.

Figure 2:
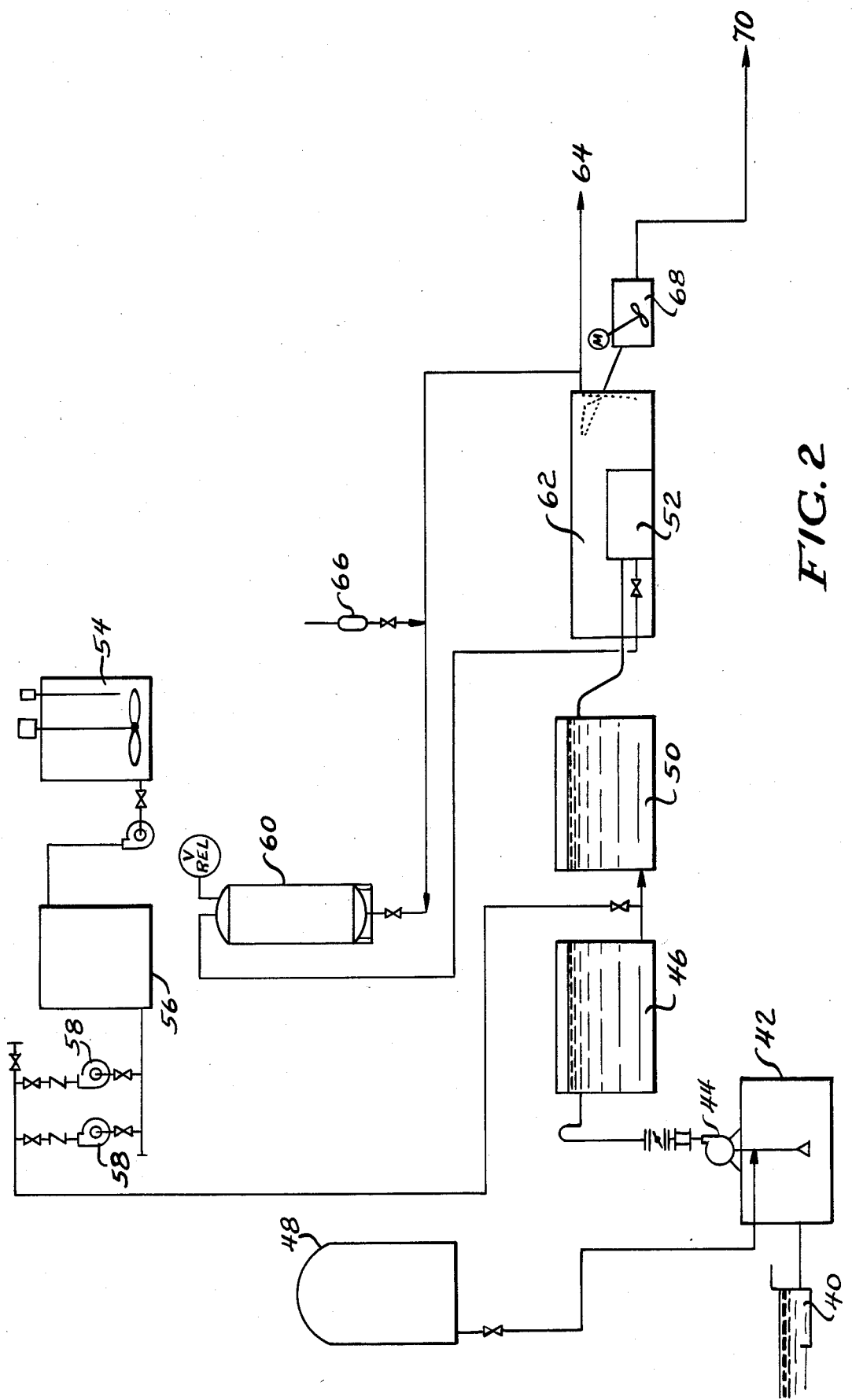
FIG. 2 is a schematic showing the preferred arrangement of component structural parts of the system of the invention.

The present invention contemplates a preferred embodiment as shown in FIG. 2. Waste water 40 which has been previously treated, described above, is introduced to a sump 42. A lift pump 44 conveys the waste water to the coagulation tank 46 while coagulant is dispensed from the coagulant storage tank 48 to the suction drawn by the pump 44. The coagulant waste water mixture is in the tank 46 for a time sufficient for coagulation of the colored bodies to be achieved. This time will vary from 1 to 10 minutes depending upon the particular coagulant used. For example, with the use of Nalco cationic polyamine (No. 8105) coagulation is achieved within one minute with an optimum dose of polymer, In the case of alum, using optimum dose, coagulation should be achieved within two minutes.

The waste stream containing the coagulant flows through a conduit to a flocculation tank 50. A floculating agent, preferably an anionic acrylamide polymer, of molecular weight in excess of twenty million (Chemlink, Inc. anionic acrylamide polymer No. 8P40) is added to the waste stream between the coagulation tank 46 and the aeration mixing tank 52. Preferably, i.e. with use of polyacrylamide, flocculation is accomplished in a tank, as shown at 50, but alternatively the floccuation agent could be added to a waste stream directly without use of a tank structure, depending on the choice of polyacrylamide.

The acrylamide polymer is mixed in a polymer mixing tank 54 and stored in dispensible concentrations in polymer storage tank 56 from where it is pumped, by pumps 58, to contact with the waste stream containing the coagulated precipitate.

Aeration mixing tank 52 receives both the waste stream from the floculation tank 50 and water saturated with dissolved air from the air solution tank 60. The aerated water is preferably stored at least 65 psi, and is introduced to the aeration mixing tank at 65 psi or above. As previously discussed, the air released from the aerated water, exposed to atmospheric pressure in the aeration mixing tank 52 is adsorbed on the flocculated matter which thereafter float to the surface of the liquid in the separation tank 62. The liquid is removed from the bottom of the separation tank 62 for release to the environment at 64, or for return to the air solution tank 60 after addition of air (at 66).

The accumulated flocculated matter removed from the separation tank 62, preferably by a skimmer (now shown), is held in a sludge storage tank 68. This collected flocculated matter is returned to the paper making processes, as previously discussed, or is treated for recovery of coagulants (as shown in FIG. 1).

The separation tank 62 preferably has surface area of 0.55 square feet times gallons per minute of fluid flow from the flocculation tank. The aeration mixing tank 52 preferably has surface area of one-tenth the surface area of the separation tank 62 and height at least two feet below the surface of the liquid level of the separation tank. The separation tank and mixing tank should be arranged to maximize the distance between the edge of the mixing tank and the liquid discharge from the separation tank. If circular tanks are used for the separation and mixing tanks 52 and 62, the mixing tank should be centered within the separation tank, while for rectangular (including square) tanks, the mixing tank 52 is located away from the discharge side of the separation tank.

The particular types of tanks, conduits, pumps and other equipment needed to practice this invention are known in the art. Similarly, the material which these tanks, conduits, pumps and other equipment contemplated by the present invention also is known in the art.

From the above description it will be apparent that there is thus provided a system and a method having the advantages described above as desirable, but which obviously is susceptible to modification and its form, method, operation, detailed construction and arrangement without departing from the principals involved or sacrificing any of its advantages.

It is to be understood, accordingly, that the invention is not limited to the specific features shown, but that the means, method and construction herein disclosed comprise a preferred form of several modes of putting the invention into effect, and the invention is, therefore, claimed in any of its forms or modifications within the legitimate and valid scope of the appended claims. The breadth of the invention shall be measured by these claims.

I claim:

1. A method of treating colored pulp mill waste water for discharge to the open environment at near neutral pH, the method comprising the steps of:
   first, primary clarification and biological treatment;
   second, adding a coagulating agent to the waste water from the clarification and biological treatment to coagulate color materials without substantial independent reduction of pH;
   third, adding a flocculating agent to the waste water containing the coagulated materials to increase the size of the coagulated materials to form a flocculated matter;
   fourth, mixing the flocculated matter with pressurized aerated water to produce air bubbles adsorbed by the materials, wherein the flocculated matter migrates to near the surface;
   fifth, separation of the flocculated matter from the waste water.

2. The method of treating pulp and paper mill waste water of claim 1,
   wherein the flocculated matter is removed from the surface of the waste water.

3. The method of treating pulp and paper mill waste water of claim 1, wherein the coagulating agent is a polyamine.

4. The method of treating pulp and paper mill waste water of claim 1, wherein the flocculating agent is in acrylamide polymer.

5. The method of treating pulp and paper mill waste water of claim 1, wherein the step of mixing the floculated matter with water saturated with air is conducted in the bottom of the tank, the tank being open to atmospheric pressure.

6. The method of treating pulp and paper mill waste water of claim 5, wherein the flocculated matter migrates to the surface of the tank and is removed by skimming.

7. The method of treating pulp and paper mill waste water of claim 6, wherein the steps are run on the waste water in a continuous process.

8. A method of converting colored paper mill waste water after initial primary clarification and biological treatment to a decolored, neutral pH liquid effluent and a solid suitable for burning for fuel, the method comprising the steps of:
  coagulating the materials in the waste water by addition of polyamine to produce a coagulant precipitated without substantial independent pH reduction;
  increasing the size of the coagulant precipitate by adding an acrylamide polymer to the waste water to form a flocculated matter;
  accumulating the flocculant in the waste water by mixing the waste water with aerated water so the flocculant will adsorb air and migrate toward the surface of the waste water; and
  removing the accumulated flocculant from the surface of the waste water.

9. The pulp and paper mill waste water treatment system of claim 2, wherein the coagulating agent is polyamine.

10. The pulp and paper mill waste water treatment system of claim 9, further comprising the steps of:
  recovering the polyamine coagulating agent by mixing the flocculated matter with strong mineral acid and acrylamide polymer, dewatering the mixture to produce a supernate which contains polyamine coagulant in a form which may be reused as a coagulating agent.

11. The pulp and paper mill waste water treatment system of claim 10, further comprising the step of:
  burning the residue from the dewatered mixture as fuel.

* * * * *